US012637300B2

(12) United States Patent
Simmler et al.

(10) Patent No.: US 12,637,300 B2
(45) Date of Patent: \*May 26, 2026

(54) HANDLING DEVICE AND METHOD FOR BUFFERING PRODUCTS, IN PARTICULAR FOODS

(71) Applicant: Syntegon Packaging Systems AG, Beringen (CH)

(72) Inventors: Yannik Simmler, Schaffhausen (CH); Linus Bänteli, Winterthur (CH); Jens Jakob Zorla, Feuerthalen (CH); Michael Rudolf, Beringen (CH); Raffael Waespi, Hemishofen (CH); Markus Lattmann, Rickenbach Sulz (CH); Ramun Seger, Beringen (CH); Michael Eder, Eggingen (DE)

(73) Assignee: Syntegon Packaging Systems AG, Beringen (CH)

( * ) Notice: Subject to any disclaimer, the term of this patent is extended or adjusted under 35 U.S.C. 154(b) by 67 days.

This patent is subject to a terminal disclaimer.

(21) Appl. No.: 18/728,693

(22) PCT Filed: Jan. 13, 2023

(86) PCT No.: PCT/EP2023/050701
§ 371 (c)(1),
(2) Date: Jul. 12, 2024

(87) PCT Pub. No.: WO2023/135236
PCT Pub. Date: Jul. 20, 2023

(65) Prior Publication Data
US 2025/0058977 A1 Feb. 20, 2025

(30) Foreign Application Priority Data
Jan. 14, 2022 (DE) ..................... 10 2022 100 854.1

(51) Int. Cl.
*B65G 47/30* (2006.01)
*B65G 15/22* (2006.01)
(Continued)

(52) U.S. Cl.
CPC ............. *B65G 47/30* (2013.01); *B65G 15/22* (2013.01); *B65G 41/002* (2013.01); *B65G 43/08* (2013.01);
(Continued)

(58) Field of Classification Search
None
See application file for complete search history.

(56) References Cited

U.S. PATENT DOCUMENTS 343,999 A 6/1886 Lucas
1,114,935 A * 10/1914 Sutton et al. ......... B07B 13/003
209/692

(Continued)

FOREIGN PATENT DOCUMENTS

CN 113697367 A * 11/2021 ............. B65G 47/74
DE 2541813 A1 4/1976
(Continued)

OTHER PUBLICATIONS

German Patent Office Action for Application No. 102022100854.1 dated Nov. 25, 2022 (12 pages including English translation).
(Continued)

*Primary Examiner* — Gene O Crawford
*Assistant Examiner* — Muhammad Awais
(74) *Attorney, Agent, or Firm* — Michael Best & Friedrich LLP

(57) ABSTRACT

A handling device for buffering products includes a transport unit having at least one feed conveying element for conveying products along a main conveying direction of the transport unit. A transverse conveying element is configured as a
(Continued)

transverse conveyor belt having a conveying direction that runs transversely to the main conveying direction, and includes a conveying element for conveying products along the main conveying direction after an influencing of a product arrangement by the transverse conveying element. The transverse conveying element is arranged downstream of the feed conveying element along the main conveying direction. The handling device includes at least one control or regulation unit for controlling or regulating a drive parameter of the transverse conveying element for influencing a product arrangement on the conveying element. The transverse conveying element is arranged inclined relative to a main conveying plane of the transport unit.

12 Claims, 3 Drawing Sheets

(51) Int. Cl.
  *B65G 41/00*          (2006.01)
  *B65G 43/08*          (2006.01)
  *B65G 47/66*          (2006.01)
(52) U.S. Cl.
  CPC ...... *B65G 47/66* (2013.01); *B65G 2201/0202* (2013.01); *B65G 2811/097* (2013.01)

(56)                References Cited

U.S. PATENT DOCUMENTS

| | | | | |
|---|---|---|---|---|
| 1,292,820 A | * | 1/1919 | Lindsley | B07B 13/003 |
| | | | | 209/692 |
| 4,054,199 A | | 10/1977 | Polderman | |
| 5,078,255 A | * | 1/1992 | Haley | B65G 47/647 |
| | | | | 198/369.2 |
| 5,423,431 A | * | 6/1995 | Westin | B07C 5/02 |
| | | | | 209/539 |
| 5,588,534 A | * | 12/1996 | Harel | B03B 9/06 |
| | | | | 209/636 |
| 5,641,052 A | * | 6/1997 | Lazzarotti | B65G 47/31 |
| | | | | 198/360 |
| 5,950,800 A | * | 9/1999 | Terrell | B65G 47/1492 |
| | | | | 198/452 |
| 6,227,377 B1 | | 5/2001 | Bonnet | |
| 8,955,664 B2 | * | 2/2015 | Lim | B65G 47/648 |
| | | | | 198/370.1 |
| 9,517,896 B2 | * | 12/2016 | Kimura | B65G 37/00 |
| 9,878,349 B2 | * | 1/2018 | Crest | B07C 1/06 |
| 10,994,948 B1 | * | 5/2021 | Dwivedi | B65G 47/46 |
| 2001/0054540 A1 | | 12/2001 | Steeber et al. | |
| 2002/0157921 A1 | | 10/2002 | Steeber et al. | |
| 2003/0075416 A1 | * | 4/2003 | Prutu | B07C 5/34 |
| | | | | 198/370.1 |
| 2003/0111319 A1 | | 6/2003 | Steeber et al. | |
| 2009/0120764 A1 | * | 5/2009 | Hysell | B65G 47/844 |
| | | | | 198/370.02 |

FOREIGN PATENT DOCUMENTS

| | | | |
|---|---|---|---|
| DE | 2508275 | A1 | 9/1976 |
| DE | 2516583 | A1 | 10/1976 |
| DE | 4412686 | A1 | 10/1995 |
| DE | 69918468 | T2 | 8/2005 |
| FR | 2104687 | A1 | 4/1972 |
| WO | 2007134602 | A1 | 11/2007 |

OTHER PUBLICATIONS

International Search Report for Application No. PCT/EP2023/050701 dated Apr. 25, 2023 (4 pages with English translation).
International Preliminary Report on Patentability for Application No. PCT/EP2023/050701 dated Jun. 20, 2024 (7 pages).
United States Patent Office Non-Final Rejection for U.S. Appl. No. 18/728,684 dated Nov. 17, 2025 (12 pages).

* cited by examiner

HANDLING DEVICE AND METHOD FOR BUFFERING PRODUCTS, IN PARTICULAR FOODS

CROSS-REFERENCE TO RELATED APPLICATIONS

This patent application is a U.S. national stage application of international patent application PCT/EP2023/050701, filed on Jan. 13, 2023, which is based on and claims priority to German patent application DE 10 2022 100 854.1, filed on Jan. 14, 2022, the contents of which are incorporated herein by reference.

BACKGROUND

The invention relates to a handling device for buffering products, in particular food products, with at least one transport unit, in particular a conveyor belt unit, which comprises at least one feed conveying element, in particular a feed conveyor belt, for conveying the products along a main conveying direction of the transport unit, further comprises at least one transverse conveying element, in particular a transverse conveyor belt, having a conveying direction which runs transversely, in particular at least substantially perpendicularly, to the main conveying direction, and comprises at least one conveying element, in particular a conveyor belt, for conveying the products along the main conveying direction, in particular after an influencing of a product arrangement by the transverse conveying element, wherein the transverse conveying element is arranged downstream of the feed conveying element along the main conveying direction and is in particular arranged directly adjoining the feed conveying element, wherein the conveying element is arranged downstream of the transverse conveying element along the main conveying direction and is in particular arranged directly adjoining the transverse conveying element, and with at least one control or regulation unit at least for a controlling or a regulation of a drive parameter of the transverse conveying element for influencing a product arrangement on the conveying element. Furthermore, the invention relates to a method for buffering products by means of the handling device.

Such handling devices and such methods are already known from the company HOUDIJK HOLLAND B. V., wherein the handling devices of the company HOUDIJK HOLLAND B. V., which are capable of carrying out a transverse movement for forming a product buffer, are marketed for example under the name PENDULUM™ SYSTEM. A disadvantage of these handling devices and methods may be that a complex technical design is necessary, that a high maintenance effort may occur as a result of the complex technical design, and that large masses must be moved in order to implement a buffering of products. These disadvantages are overcome by the present invention.

Furthermore, a handling device is already known from DE 699 18 468 T2, which comprises a transverse conveying element that changes a drive direction depending on a drive parameter of a conveying element cooperating with the transverse conveying element, wherein the transverse conveying element has a conveying surface extending parallel to a conveying surface of the conveying element that directly adjoins the transverse conveying element.

SUMMARY

The objective of the invention is in particular to provide a generic handling device and a generic method having improved properties with regard to a structurally simple technical design as well as low-maintenance operation.

The invention is based on a handling device for a buffering of products, in particular food products, with at least one transport unit, in particular a conveyor belt unit, which comprises at least one feed conveying element, in particular a feed conveyor belt, for conveying the products along a main conveying direction of the transport unit, further comprises at least one transverse conveying element which is embodied as a transverse conveyor belt and which has a conveying direction that runs transversely, in particular at least substantially perpendicularly, to the main conveying direction, and comprises at least one conveying element, in particular a conveyor belt, for conveying the products along the main conveying direction after an influencing of a product arrangement by the transverse conveying element, wherein the transverse conveying element is arranged downstream of the feed conveying element along the main conveying direction, and is in particular arranged directly adjoining the feed conveying element, wherein the conveying element is arranged downstream of the transverse conveying element along the main conveying direction, and is in particular arranged directly adjoining the transverse conveying element, and with at least one control or regulation unit at least for a controlling or a regulation of a drive parameter of the transverse conveying element for influencing a product arrangement on the conveying element.

It is proposed that the transverse conveying element that is embodied as a transverse conveyor belt, in particular at least one conveying surface of the transverse conveying element, is arranged so as to be inclined relative to a main conveying plane, in particular a horizontal plane, of the transport unit. In addition, it is conceivable that the transverse conveying element, in particular at least the conveying surface of the transverse conveying element, is arranged so as to be inclined relative to the main conveying direction. The implementation of the handling device according to the invention advantageously allows achieving a structurally simple implementation of the transverse conveying element, which has a small number of movable parts and enables an advantageous realization of a belt chute, in particular in a driveless state of the transverse conveying element. Advantageously, a structurally simple adjustment of a buffer ratio can be realized as a result of an influencing of a drive parameter of the transverse conveying element. For example, as a consequence of a standstill of the transverse conveying element a belt chute can be realized, such that conveyed products can slide on the conveying surface of the transverse conveying element, in particular without an effect of drive forces of the transverse conveying element on the conveyed products. For example, as a result of a drive of the transverse conveying element, a movement of conveyed products transversely to the main conveying direction can be realized, wherein a buffer ratio of conveyed products can be set as a function of a speed or of an acceleration of the transverse conveying element. Due to a small number of movable parts, advantageously a low-maintenance implementation of the handling device can be realized. For example, it is conceivable in the case of the alternative or additional sorting function that a product that is damaged or has another deficiency is conveyed by means of the transverse conveying element into a collecting unit, for example a collecting container. Other functions or fields of application of the transverse conveying element that appear expedient to someone skilled in the art are also conceivable, like for example a formation of a division conveying unit by the transverse conveying element, by means of which a division of the main product stream into at least two product sub-streams may be enabled, in particular depending on an influencing of a drive parameter of the transverse conveying element. It is moreover conceivable that the handling device according to the invention is realized in an alternative implementation so as to be independent of an inclination of the transverse conveying element, in particular of the conveying surface of the transverse conveying element, relative to the main conveying plane of the transport unit, in particular relative to the horizontal plane. In the alternative implementation of the handling device according to the invention, in particular in the alternative implementation that is independent of the inclination of the transverse conveying element, in particular of the conveying surface of the transverse conveying element, relative to the main conveying plane of the transport unit, in particular relative to the horizontal plane, the handling device according to the invention preferably comprises at least one transport unit, in particular a conveyor belt unit, which comprises at least one feed conveying element, in particular a feed conveyor belt, for conveying the products along a main conveying direction of the transport unit, further comprises at least one transverse conveying element, in particular a transverse conveyor belt, which has a conveying direction that runs transversely, in particular at least substantially perpendicularly, to the main conveying direction, and comprises at least one conveying element, in particular a conveyor belt, for conveying the products, in particular after an influencing of a product arrangement by the transverse conveying element, along the main conveying direction, wherein the transverse conveying element is arranged downstream of the feed conveying element along the main conveying direction, and is in particular arranged directly adjoining the feed conveying element, wherein the conveying element is arranged downstream of the transverse conveying element along the main conveying direction, and is in particular arranged directly adjoining the transverse conveying element, and comprises at least one control or regulation unit at least for a controlling or a regulation of a drive parameter of the transverse conveying element for an influencing of a product arrangement on the conveying element, wherein the transverse conveying element, in particular the transverse conveyor belt, is supported so as to be movable along the conveying direction in a movement plane, which is in particular at least substantially parallel to the main conveying plane, in particular to the horizontal plane, and/or to the main conveying direction, and is in particular drivable in a circulating manner, preferably in order to realize a buffer function.

The handling device is preferably part of a production machine for a production and/or a packaging of products, in particular food products and preferably confectionery products, like for example chocolate bars, biscuits, cookies or the like. The transport unit is preferably realized as a conveyor belt unit. The transport unit preferentially comprises at least the feed conveying element, in particular the feed conveyor belt, by means of which products can be conveyed, in particular along the main conveying direction. The main conveying direction preferably runs at least substantially parallel to a horizontal plane. The main conveying direction preferably runs at least substantially parallel to a product support surface of the feed conveying element, in particular in at least one implementation of the handling device. The main conveying direction preferably runs at least substantially parallel to a longitudinal axis of the feed conveying element, in particular in at least one implementation of the handling device. "Substantially parallel" is in particular to mean an orientation of a direction relative to a reference direction, in particular in a plane, wherein the direction has a deviation from the reference direction that is in particular less than 8°, advantageously less than 5° and particularly advantageously less than 2°. The product support surface of the feed conveying element preferably forms a surface of the feed conveying element on which the products rest during a transport by the feed conveying element.

The transport unit preferably comprises at least the feed conveying element that is embodied as a feed conveyor belt and on which the transverse conveying element is arranged along the main conveying direction, in particular directly. The feed conveying element is preferentially embodied as a circulating feed conveyor belt. The feed conveying element is preferably supported movably on a guide unit, in particular a frame, of the transport unit. The transport unit preferably comprises at least one drive unit for a movement, in particular for a circulating drive, of the feed conveying element relative to the frame of the transport unit. The drive unit preferably comprises at least one electromotor. In particular, the electromotor is configured for a rotating drive of a drive roller adjoining the feed conveying element that is embodied as a feed conveyor belt. The electromotor may be connected to the drive roller directly or may be connected to the drive roller indirectly via, for example, a gear, a belt drive, a chain, a gearwheel or the like. Alternatively or additionally, the drive unit may comprise further components which are deemed expedient by someone skilled in the art and which are configured for a drive of the feed conveying element, or the drive unit may have a different implementation deemed expedient by someone skilled in the art, such as, for example, an implementation as an electrodynamic movement system as is known, for example, from magnetic levitation technology.

It is conceivable that the transport unit comprises a plurality of feed conveying elements, which are configured for a transport of products and which are in particular arranged consecutively. "Configured" is in particular to mean specifically programmed, specifically constructed, specifically designed and/or specifically equipped. By an object or a unit being configured for a specific function is in particular to be understood that the object or the unit fulfils and/or carries out this specific function in at least one application state and/or operation state. In the case of an implementation of the transport unit with a plurality of feed conveying elements, the feed conveying elements may have an analogous implementation, such as, for example, an implementation as feed conveyor belts, or the feed conveying elements may be implemented differently, such as, for example, an implementation of some feed conveying elements as feed conveyor belts and of some feed conveying elements as chain conveyors or belt conveyors, an implementation of some feed conveying elements as feed conveyor belts and of some feed conveying elements as electrodynamic feed conveying elements, such as, for example, movers or the like, an implementation of some feed conveying elements as feed conveyor belts and of some feed conveying elements as grippers or sliders or the like. A combination of the implementation variants given above, deemed expedient by someone skilled in the art, is also conceivable. In the case of an implementation of the transport unit with a plurality of feed conveying elements, the feed conveying elements may be drivable by means of a single drive unit, or at least one individual drive unit is assigned to each feed conveying element.

The transverse conveying element is configured, in particular as a result of an oscillating movement, to change a product arrangement in order to realize a buffering of the products. The transverse conveying element is preferentially drivable so as to go back and forth along and counter to the conveying direction. It is also conceivable that the transverse conveying element is additionally configured to realize a division function, in particular by a movement just along or counter to the conveying direction for a discharging of products and/or by a division of the main product stream into at least two product substreams. The transverse conveying element may form a division conveying unit. The transverse conveying element is preferentially movable, in particular drivable, along the conveying direction that runs transversely, in particular at least perpendicularly, to the main conveying direction. The term "substantially perpendicular" is in particular meant to define an orientation of a direction relative to a reference direction, wherein the direction and the reference direction include an angle of 90°, in particular when viewed in a projection plane, and the angle has a maximum deviation of in particular less than 8°, advantageously less than 5° and particularly advantageously less than 2°. The transverse conveying element is preferentially embodied as a transverse conveyor belt which is drivable along the conveying direction that runs transversely, in particular at least substantially perpendicularly, to the main conveying direction. The transport unit preferentially comprises at least one transverse drive unit for a movement, in particular for a circulating drive, of the transverse conveying element relative to a further guide unit, in particular to a further frame, of the transport unit. The transverse drive unit preferably comprises at least one electromotor. In particular, the electromotor is configured for a rotating drive of a drive roller adjoining the transverse conveying element which is embodied as a transverse conveyor belt. The electromotor may be connected to the drive roller directly or may be connected to the drive roller indirectly via, for example, a gear, a belt drive, a chain, a gearwheel or the like. Alternatively or additionally, the transverse drive unit may comprise further components which are deemed expedient by someone skilled in the art and which are configured for a drive of the transverse conveying element, or the transverse drive unit may have a different implementation deemed expedient by someone skilled in the art, such as, for example, an implementation as an electrodynamic movement system as is already known, for example, from conveying technology.

The handling device may comprise at least one substream transport unit, in particular a substream conveyor belt unit, by means of which after a division of a main product stream into at least two product substreams one of the product substreams can be conveyed, and may comprise at least one further substream transport unit, in particular a further substream conveyor belt unit, by means of which after a division of the main product stream into at least two product substreams one of the product substreams can be conveyed, wherein the substream transport unit and/or the further substream transport unit are/is arranged offset relative to the transport unit along a direction that runs at least substantially perpendicularly to the main conveying plane, in particular to the horizontal plane wherein, for a bridging of the offset between the transport unit and the substream transport unit and/or between the transport unit and the further substream transport unit, the transverse conveying element is arranged so as to be inclined relative to the main conveying plane, in particular to the horizontal plane, and/or relative to the main conveying direction. The substream conveying unit is preferably formed by the conveying element. Products are preferentially transferred from the main product stream to the substream transport unit and/or to the further substream transport unit by means of the transverse conveying element.

A division ratio of conveyed products is preferably settable depending on a speed or on an acceleration of the transverse conveying element. In the case of a standstill, in particular in a movement-free state, of the transverse conveying element, the products of the main product stream are transferred to the substream transport unit by the transverse conveying element in an undivided manner, in particular as a result of the products sliding down onto the substream transport unit via the transverse conveying element. In a driven state of the transverse conveying element, the products of the main product stream are divided onto the substream transport unit and the further substream transport unit depending on a speed or on an acceleration of the transverse conveying element, wherein the main product stream is divided into the product substream along the substream transport unit and into the further product substream along the further substream transport unit. The substream transport unit is preferably arranged downstream of the transverse conveying element. The conveying element preferably follows, and is in particular directly adjacent to, the transverse conveying element. A substream conveying direction of the substream transport unit preferably runs at least substantially parallel to the main conveying direction of the transport unit. However, it is also conceivable that the substream conveying direction of the substream transport unit runs transversely to the main conveying direction of the transport unit. It is conceivable that a further transverse conveying element of the handling device is arranged downstream of the substream transport unit, in order to realize a buffer function in the product substream of the substream transport unit. In particular, the further substream transport unit comprises a substream transport element that is embodied as a conveyor belt. The further substream transport unit is preferably arranged downstream of the transverse conveying element. The substream transport element of the further substream transport unit preferably follows, and is in particular directly adjacent to, the transverse conveying element. A substream conveying direction of the further substream transport unit preferably runs transversely to the main conveying direction of the transport unit. However, it is also conceivable that the substream conveying direction of the further substream transport unit runs at least substantially parallel to the main conveying direction of the transport unit. It is conceivable that an additional transverse conveying element of the handling device is arranged downstream of the further substream transport unit in order to realize a buffer function in the product substream of the further substream transport unit. Further arrangements of substream transport units and/or transverse conveying elements, deemed expedient by someone skilled in the art, are also conceivable.

The transverse conveying element, in particular at least the conveying surface of the transverse conveying element, is preferably arranged so as to be inclined relative to the main conveying plane of the transport unit and to the main conveying direction in such a way that the transverse conveying element forms a belt chute, in particular in at least one operation state. The conveying surface of the transverse conveying element is preferably a surface of the transverse conveying element on which the products rest while being conveyed by the transverse conveying element. The main conveying plane of the transport unit is preferably formed, in particular at least partially, by the product support surface of the feed conveying element. The transverse conveying element, in particular at least the conveying surface of the transverse conveying element, is preferably arranged so as to be inclined relative to the product support surface of the feed conveying element. An inclination angle of the transverse conveying element, in particular of the conveying surface, relative to the main conveying plane and/or relative to the main conveying direction is preferably measured starting from the transverse conveying element, in particular starting from the conveying surface, in a direction facing away from a ground contact surface of the handling device. Preferentially, viewed along the direction that faces away from the ground contact surface of the handling device, the inclination angle of the transverse conveying element, in particular of the conveying surface, relative to the main conveying plane and/or relative to the main conveying direction is arranged between the conveying surface and the main conveying plane and/or the main conveying direction, in particular starting from the conveying surface. The conveying surface and the main conveying plane and/or the main conveying direction preferably include the inclination angle on a side of the transverse conveying element that faces away from the ground contact surface.

The main conveying plane and/or the main conveying direction of the transport unit may be oriented at an inclination relative to the ground contact surface of the handling device. However, it is also conceivable that the main conveying plane and/or the main conveying direction of the transport unit are/is oriented at least substantially parallel to the ground contact surface of the handling device. The ground contact surface of the handling device is preferably realized by an area of a machine frame of the handling device by means of which the machine frame stands on a ground, in particular a production hall floor, in a ready-to-operate state of the handling device. The ground contact surface is preferably oriented at least substantially parallel to the horizontal plane. The main conveying plane and/or the main conveying direction of the transport unit may be oriented at an inclination relative to the horizontal plane. However, it is also conceivable that the main conveying plane and/or the main conveying direction of the transport unit are/is oriented at least substantially parallel to the horizontal plane, in particular in at least one implementation of the handling device. Alternatively or additionally, it is conceivable that an orientation of the main conveying plane and/or the main conveying direction of the transport unit relative to the ground contact surface and/or relative to the horizontal plane are/is adjustable, in particular step-wise or continuously. In the case of an adjustable orientation of the main conveying plane and/or of the main conveying direction of the transport unit relative to the ground contact surface and/or relative to the horizontal plane, it is conceivable that the orientation may be realized manually or in an actuator-assisted manner. Further implementations deemed expedient by someone skilled in the art, in particular with regard to an orientation of the main conveying plane and/or of the main conveying direction of the transport unit relative to the ground contact surface and/or relative to the horizontal plane, are also conceivable.

A "control or regulation unit" is in particular to mean a unit with at least one electronic control unit. An "electronic control unit" is in particular to mean a unit with a processor unit and with a memory unit and with an operating program stored in the memory unit. The control or regulation unit is preferably configured for actuating the transverse drive unit in such a way that the transverse conveying element is moved so as to go back and forth along the conveying direction and counter to the conveying direction, in particular in order to influence a product arrangement. An amplitude of a deflection of the transverse conveying element in the case of a back and forth drive of the transverse conveying element is preferably adjustable or variable by means of the control or regulation unit, in particular as a function of a product parameter and/or of a production-specific parameter.

Furthermore, it is proposed that an inclination angle of the transverse conveying element, in particular of the conveying surface of the transverse conveying element, relative to the main conveying plane and/or relative to the main conveying direction has a value from a value range between 0° and 90°. Preferably the inclination angle of the transverse conveying element, in particular of the conveying surface of the transverse conveying element, relative to the main conveying plane and/or relative to the main conveying direction has a value that is greater than 0° and smaller than 90°, in particular in the case of an arrangement of the inclination angle on a side of the transverse conveying element that faces away from the ground contact surface. Preferentially the inclination angle of the transverse conveying element, in particular of the conveying surface, relative to the main conveying plane and/or relative to the main conveying direction has a value that is greater than 15° and smaller than 75°, in particular in the case of an arrangement of the inclination angle on a side of the transverse conveying element that faces away from the ground contact surface. In a measurement of a further inclination angle of the transverse conveying element, in particular of the conveying surface of the transverse conveying element, relative to the main conveying plane and/or relative to the main conveying direction on a side of the transverse conveying element that faces the ground contact surface, the further inclination angle preferably has a value from a value range between 0° and 180°. Preferentially the further inclination angle of the transverse conveying element, in particular of the conveying surface of the transverse conveying element, relative to the main conveying plane and/or relative to the main conveying direction has a value that is greater than 0° and smaller than 180°, in particular in the case of an arrangement of the further inclination angle on a side of the transverse conveying element that faces towards the ground contact surface. Preferably the further inclination angle of the transverse conveying element, in particular of the conveying surface of the transverse conveying element, relative to the main conveying plane and/or relative to the main conveying direction has a value that is greater than 105° and smaller than 165°, in particular in the case of an arrangement of the inclination angle on a side of the transverse conveying element that faces towards the ground contact surface. Preferentially a sum of the inclination angle and the further inclination angle is, in particular always, 180°. The implementation of the handling device according to the invention advantageously allows achieving a structurally simple implementation of the transverse conveying element, which has a small number of movable parts and enables an advantageous realization of a belt chute, in particular in a driveless state of the transverse conveying element. Advantageously, as a result of an influencing of a drive parameter of the transverse conveying element, structurally simple adjustment of a buffer ratio can be realized. For example, as a consequence of a standstill of the transverse conveying element a belt chute can be realized, such that conveyed products can glide on the conveying surface of the transverse conveying element, in particular without an effect of drive forces of the transverse conveying element on the conveyed products. For example, as a result of a drive of the transverse conveying element, a movement of conveyed products transversely to the main conveying direction can be realized, wherein a buffer ratio of conveyed products is adjustable as a function of a speed or of an acceleration of the transverse conveying element. Due to a small number of movable parts, advantageously a low-maintenance implementation of the handling device can be realized. Advantageously, reliable conveying of products and reliable buffer formation of products can be realized.

It is further proposed that the transverse conveying element that is embodied as a transverse conveyor belt is supported movably along the conveying direction, and is in particular drivable in a circulating manner, in a movement plane that is inclined relative to the main conveying plane, in particular relative to the horizontal plane, and/or relative to the main conveying direction. The transverse conveying element, in particular the transverse conveyor belt, is preferentially drivable in a circulating manner around the further guide unit of the transport unit, which is in particular at least substantially stationary relative to the guide unit of the transport unit. The guide unit of the transport unit is preferably realized as a frame on which the feed conveying element, in particular the conveyor belt, of the transport unit is supported movably. The further guide unit of the transport unit is preferentially realized as a frame on which the transverse conveying element that is embodied as a transverse conveyor belt is supported movably, in particular via guide rollers and/or drive rollers. During operation of the handling device, the further guide unit of the transport unit is preferably arranged so as to be stationary relative to the guide unit of the transport unit. It is conceivable that a position of the further guide unit of the transport unit relative to the guide unit of the transport unit is adjustable, in particular for an adjustment of the inclination angle of the transverse conveying element relative to the main conveying plane of the transport unit and/or relative to the main conveying direction of the transport unit, preferentially in an operation-free state of the handling device. Preferably, for a buffering of products, in particular for an influencing of the product arrangement, in particular exclusively, the transverse conveying element is moved relative to the further guide unit of the transport unit and relative to the guide unit of the transport unit. The further guide unit of the transport unit preferentially remains immobile during a buffering of products, in particular during an influencing of the product arrangement. The implementation of the handling device according to the invention advantageously allows achieving a structurally simple implementation of the transverse conveying element, which has a small number of movable parts and enables an advantageous realization of a belt chute, in particular in a driveless state of the transverse conveying element. Advantageously, an influencing of a drive parameter of the transverse conveying element allows realizing a structurally simple adjustment of a buffer ratio. For example, as a consequence of a standstill of the transverse conveying element a belt chute can be realized, such that conveyed products can glide on the conveying surface of the transverse conveying element, in particular without an effect of drive forces of the transverse conveying element on the conveyed products. For example, by means of a drive of the transverse conveying element, a movement of conveyed products transversely to the main conveying direction can be realized, wherein a buffer ratio of conveyed products can be set as a function of a speed or of an acceleration of the transverse conveying element. Due to a small number of movable parts, advantageously a low-maintenance implementation of the handling device can be realized. Advantageously, reliable conveying of products and reliable buffer formation of products can be realized.

It is further proposed that the control or regulation unit is configured for a controlling or regulation of a drive param-eter of the transverse conveying element, which is realized as a movement of the transverse conveying element in a movement plane of the transport unit that is inclined relative to the main conveying plane, in particular to the horizontal plane, and/or relative to the main conveying direction, in particular for a controlling or regulation of a conveyor belt speed and/or a conveyor belt circulation direction of the transverse conveying element, for the purpose of influencing the product arrangement on the conveying element. The implementation of the handling device according to the invention advantageously allows realizing a structurally simple adjustment of a buffer ratio as a result of an influencing of a drive parameter of the transverse conveying element. For example, as a consequence of a standstill of the transverse conveying element a belt chute can be realized, such that conveyed products can glide on the conveying surface of the transverse conveying element, in particular without an effect of drive forces of the transverse conveying element on the conveyed products. For example, as a result of a drive of the transverse conveying element, a movement of conveyed products transversely to the main conveying direction can be realized, wherein a buffer ratio of conveyed products can be set as a function of a speed or of an acceleration of the transverse conveying element. Due to a small number of movable parts, advantageously a low-maintenance implementation of the handling device can be realized. Advantageously, reliable conveying of products and reliable buffer formation of products can be realized.

It is further proposed that the handling device comprises at least one sensor unit for a detection of a product param-eter, in particular a position, of products, wherein the control or regulation unit is configured for a controlling or regula-tion of a movement of the transverse conveying element in a movement plane of the transport unit that is inclined relative to the main conveying plane, in particular relative to the horizontal plane, and/or relative to the main conveying direction, depending on at least one sensor signal of the sensor unit. Alternatively or additionally, the sensor unit is configured for a detection of a production-specific param-eter. The sensor unit is preferably connected to the control or regulation unit in terms of data technology. A speed param-eter and/or an amplitude of a movement of the transverse conveying element is preferably controlled by the control or regulation unit depending on product parameters detected by the sensor unit. Alternatively or additionally, it is also conceivable that the control or regulation unit is configured for a controlling or regulation of the at least one speed parameter and/or an amplitude of a movement of the trans-verse conveying element following a program that runs independently of sensor data. The sensor unit preferably comprises at least one sensor element for a detection of product parameters. The sensor element may have any implementation deemed expedient by someone skilled in the art, such as, for example, an implementation as a camera, as a line laser, as an infrared sensor, as a light barrier, as a weighing sensor, as a position sensor or the like. The sensor unit may comprise a plurality of sensor elements for a detection of different product parameters. However, it is also conceivable that the sensor unit comprises only a single sensor element, by means of which a single product param-eter or different product parameters can be detected. Further implementations of the sensor unit that appear expedient to someone skilled in the art are also conceivable. The product parameter may be, for example, a quality of a product (defective product or OK product), a weight of a product, a size of a product, a position of a product, an orientation of a product or the like. A production-specific parameter may be a number of products, a sequence of products or the like. The transverse element is preferably movable in such a way that a distribution of products relative to a maximum width of the conveying element is variable in comparison with a distribution of products on the feed conveying element. The implementation of the handling device according to the invention advantageously allows realizing a reliable actuation of the transverse conveying element. Advantageously, as a result of an influencing of a drive parameter of the transverse conveying element, structurally simple adjustment of a buffer ratio can be realized. For example, as a consequence of a standstill of the transverse conveying element a belt chute can be realized, such that conveyed products can glide on the conveying surface of the transverse conveying element, in particular without an effect of drive forces of the transverse conveying element on the conveyed products. For example, as a result of a drive of the transverse conveying element, a movement of conveyed products transversely to the main conveying direction can be realized, wherein a buffer ratio of conveyed products can be set as a function of a speed or of an acceleration of the transverse conveying element. Due to a small number of movable parts, advantageously a low-maintenance implementation of the handling device can be realized. Advantageously, reliable conveying of products and reliable buffer formation of products can be realized.

Furthermore, it is proposed that the handling device comprises at least one adjustment unit for an, in particular continuous, adjustment of an inclination angle, in particular the aforementioned inclination angle, of the transverse conveying element, in particular of the conveying surface of the transverse conveying element, relative to the main conveying plane and/or relative to the main conveying direction, in particular by a movable support of the transverse conveying element around a pivot axis of the adjustment unit that extends at least substantially parallel to the conveying direction. For example, it is conceivable that the further guide unit of the transport unit is supported pivotably on the guide unit of the transport unit, in particular in order to realize an adjustment of the inclination angle of the transverse conveying element. The pivot axis preferably runs at least substantially parallel to the main conveying plane and at least substantially perpendicularly to the main conveying direction. It is conceivable that the adjustment unit comprises at least one actuator, which is configured to generate a drive force for an adjustment of the inclination angle of the transverse conveying element. The actuator may be realized as a servomotor, as a spindle motor or as another actuator deemed expedient by someone skilled in the art. The actuator may be capable of being actuated by the control or regulation unit. Alternatively, it is conceivable that the adjustment unit is realized as a manual adjustment unit and is configured for an adjustment of the inclination angle of the transverse conveying element brought about by a force input of an operator. The implementation according to the invention enables an advantageous adaptation to conditions of an installation location or to customer requirements. Advantageously, a structurally simple implementation of the transverse conveying element is achievable, which has a small number of movable parts and enables an advantageous realization of a belt chute, in particular in a driveless state of the transverse conveying element, in particular a belt chute that is adjustable at least with regard to an inclination.

It is moreover proposed that the handling device comprises at least one bridging unit, which in particular comprises at least one, preferably elastic, bridging element, at least for a bridging or a covering of a gap between the transverse conveying element and the conveying element. The bridging element is preferably made of rubber, in particular of an elastomer. The bridging element is preferably realized as a rubber lip. It is also conceivable that the bridging element is made of a synthetic material and is arranged as kind of an intermediate piece, such as for example a ramp or the like, between the feed conveying element and the transverse conveying element. However, it is also conceivable that the bridging element has a different implementation deemed expedient by someone skilled in the art and/or is made of a different material deemed expedient by someone skilled in the art. The bridging unit preferably comprises at least one further bridging element, which is configured for a bridging or a covering of a gap between the transverse conveying element and the substream transport unit and/or between the transverse conveying element and the further substream transport unit. The further bridging element may have an implementation analogous to the bridging element or may have an implementation different from the bridging element. The implementation according to the invention advantageously enables gentle handling of products during a transition after the transverse conveying element, in particular after the belt chute. Moreover, if there is a flexibly adjustable inclination angle, advantageously gentle transfer from the transverse conveying element to the substream transport units can be realized, in particular since a gap between the division conveying unit and the substream transport units can be kept small or can be largely avoided. Advantageously, a structurally simple implementation of the transverse conveying element is achievable, which has a small number of movable parts and enables an advantageous realization of a belt chute, in particular in a driveless state of the transverse conveying element.

Furthermore, a production machine with at least one handling device according to the invention is proposed. The production machine may comprise further devices deemed expedient by someone skilled in the art, like for example a production device for a production of products, a packaging device for a packaging of products, a sterilization apparatus for a sterilization of packagings and/or of products, or other devices deemed expedient by someone skilled in the art. The implementation according to the invention advantageously allows realizing a production machine by means of which a product-gentle conveying, a structurally simple adjustment of a buffer ratio and/or a high level of operator safety are/is attainable.

Furthermore, the invention is based on a method for a buffering of products, in particular food products, by means of the handling device according to the invention. It is proposed that a product arrangement on the conveying element is influenced depending on a drive parameter of the transverse conveying element embodied as a transverse conveyor belt, which is realized as a conveyor belt speed, and/or depending on a drive parameter of the transverse conveying element embodied as a transverse conveyor belt, which is realized as a conveyor belt circulation direction. It is also proposed that, in a non-conveying state of the transverse conveying element embodied as a transverse conveyor belt, the products are conveyed along the main conveying direction, via the transverse conveying element, in particular the conveying surface, due to a sliding friction between the transverse conveying element, in particular the conveying surface, and the products. With regard to further method steps of the method for a division of a main product stream, reference may be made to the preceding description of the handling device and/or of the production machine as this description is also to be read analogously on the method, and thus all features concerning the handling device and/or the production machine are also to be considered as disclosed with regard to the method for a division of a main product stream. The implementation according to the invention advantageously allows realizing a structurally simple adjustment of a buffer ratio as a result of an influencing of a drive parameter of the transverse conveying element. For example, as a consequence of a standstill of the transverse conveying element a belt chute can be realized, such that conveyed products can glide on the conveying surface of the transverse conveying element, in particular without an effect of drive forces of the transverse conveying element on the conveyed products. For example, as a result of a drive of the transverse conveying element, a movement of conveyed products transversely to the main conveying direction can be realized, wherein a buffer ratio of conveyed products can be set as a function of a speed or of an acceleration of the transverse conveying element.

The handling device according to the invention, the production machine according to the invention and/or the method according to the invention shall here not be limited to the application and implementation described above. In particular, in order to fulfil a functionality that is described here, the handling device according to the invention, the production machine according to the invention and/or the method according to the invention may have a number of individual elements, components and units as well as method steps that differs from a number given here. Moreover, for the value ranges given in this disclosure, values lying within the mentioned limits shall also be considered as disclosed and as applicable as desired.

BRIEF DESCRIPTION OF THE DRAWINGS

Further advantages will become apparent from the following description of the drawings. Exemplary embodiments of the invention are shown in the drawings. The drawings, the description and the claims contain a plurality of features in combination. Someone skilled in the art will purposefully also consider the features individually and will find further expedient combinations.

In the drawings.

DETAILED DESCRIPTION

Figure 1:
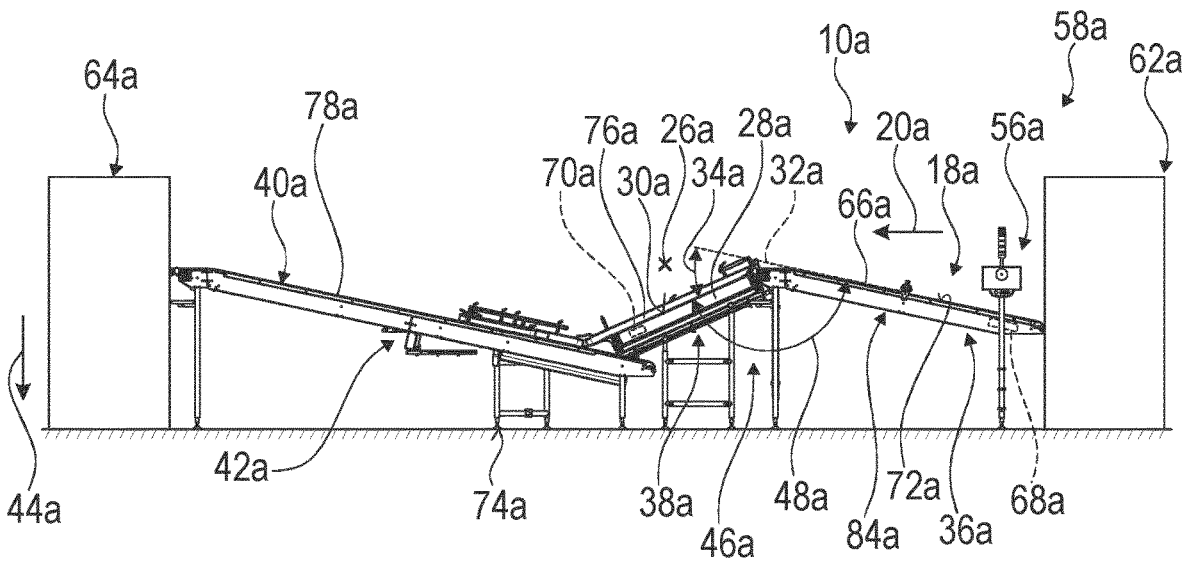
FIG. 1 shows a production machine according to the invention with a handling device according to the invention for a division of a main product stream, in a schematic representation.

FIG. 1 shows a production machine 58a for a production and/or a packaging of products 24a, in particular food products. The production machine 58a preferentially comprises at least one production device 62a for a production of the products 24a (cf. FIG. 2), in particular confectionery products, like for example chocolate bars, biscuits, cookies or the like. The production machine 58a comprises at least one handling device 10a for a handling of the products 24a. The handling device 10a is preferentially configured for a buffering of products 24a. Alternatively or additionally, it is conceivable that the handling device 10a is configured for a division of a main product stream 12a of the products 24a, in particular for a division of the main product stream 12a into at least two product substreams 14a, 16a. Preferably each of the product substreams 14a, 16a is fed to its own packaging device 64a of the production machine 58a (in FIG. 1 only one packaging device 64a is shown by way of example). However, it is also conceivable that the product substreams 14a, 16a are fed to other devices of the production machine 58a which appear expedient to someone skilled in the art. Alternatively or additionally, the handling device 10a may be configured for further functions deemed expedient by someone skilled in the art, like for example for a discharging of products 24a or the like. Preferably the production machine 58a comprises at least one packaging device 64a for a packaging of the products 24a. The handling device 10a is preferably arranged in a region between the production device 62a and the packaging device 64a, in particular viewed along a course of a product stream. However, it is also conceivable that the handling device 10a is alternatively arranged in a different position, deemed expedient to someone skilled in the art, within the production machine 58a or at a production line comprising at least the handling device 10a. The production machine 58a may comprise further devices deemed expedient by someone skilled in the art, like a sterilization apparatus for a sterilization of packagings and/or of products 24a or other devices deemed expedient by someone skilled in the art.

Figure 2:
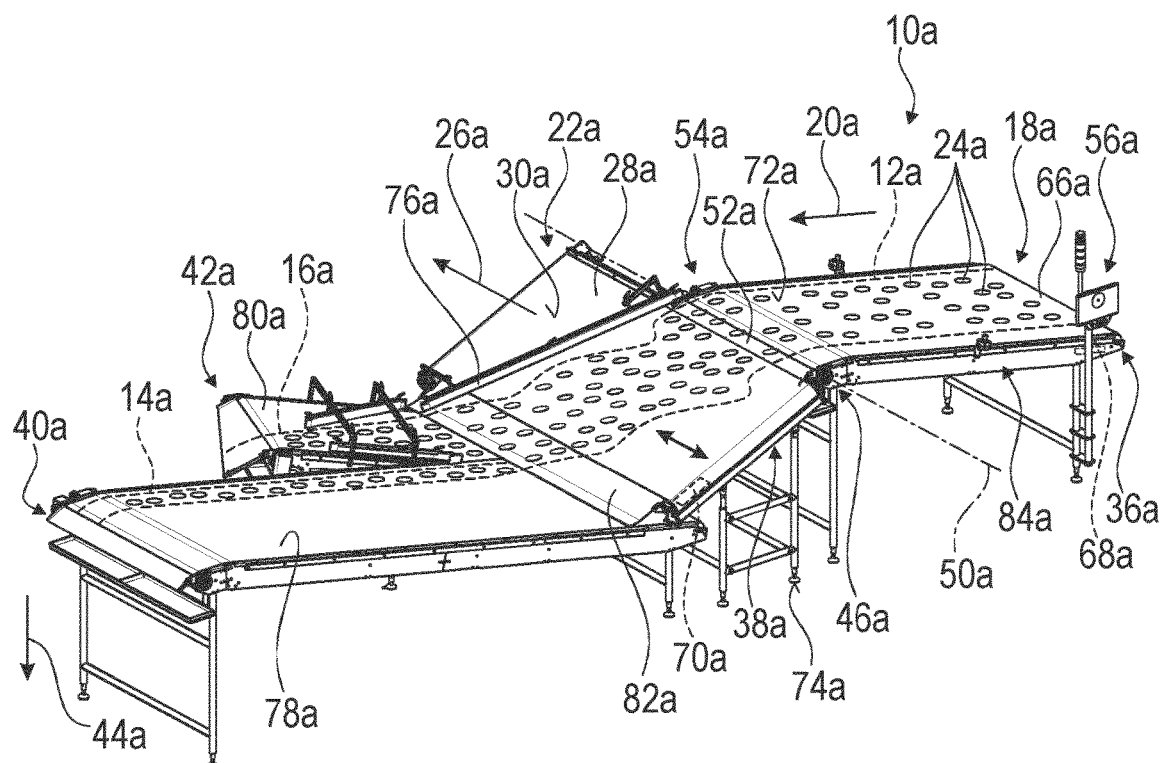
FIG. 2 shows a detail view of the handling device according to the invention in a schematic representation.

FIG. 2 shows a detail view of the handling device 10a for a buffering of the products 24a. The handling device 10a comprises at least one transport unit 18a, in particular a conveyor belt unit, including at least one feed conveying element 66a, in particular a feed conveyor belt, for conveying the products 24a along a main conveying direction 20a of the transport unit 18a, further including at least one transverse conveying element 28a, in particular a transverse conveyor belt, which has a conveying direction 26a that runs transversely, in particular at least substantially perpendicularly, to the main conveying direction 20a, and including at least one conveying element 78a, in particular a conveyor belt, for conveying the products 24a along the main conveying direction 20a, in particular after an influencing of a product arrangement by the transverse conveying element 28a. The transverse conveying element 28a is arranged downstream of the feed conveying element 66a along the main conveying direction 20a, in particular directly adjoining the feed conveying element 66a. The conveying element 78a is arranged downstream of the transverse conveying element 28a along the main conveying direction 20a, in particular directly adjoining the transverse conveying element 28a. The handling device 10a comprises the feed conveying element 66a, by means of which a main product stream 12a of the products 24a can be conveyed along the main conveying direction 20a of the transport unit 18a. The main conveying direction 20a preferably runs at least substantially parallel to a horizontal plane. Preferentially the feed conveying element 66a is realized as a circulating feed conveyor belt. The feed conveying element 66a is preferably supported movably on a guide unit 36a, in particular a frame, of the transport unit 18a. The transport unit 18a preferentially comprises at least one drive unit 68a for a movement, in particular for a circulating drive, of the feed conveying element 66a relative to the guide unit 36a, in particular relative to the frame, of the transport unit 18a. The drive unit 68a preferably comprises at least one electromotor (not illustrated here in detail). In particular, the electromotor is configured for a rotating drive of a drive roller (not illustrated here in detail) adjoining the feed conveying element 66a that is embodied as a feed conveyor belt. The electromotor may be connected to the drive roller directly or may be connected to the drive roller indirectly via, for example, a gear, a belt drive, a chain, a gearwheel or the like. Alternatively or additionally, the drive unit 68a may comprise further components which are deemed expedient by someone skilled in the art and which are configured for a drive of the feed conveying element 66a, or the drive unit 68a and/or the feed conveying element 66a may have a different implementation deemed expedient by someone skilled in the art. The feed conveying element 66a, in particular a product support surface 72a of the feed conveying element 66a, is oriented so as to be inclined relative to the horizontal plane, in particular in the exemplary embodiment of the handling device 10a illustrated in FIGS. 1 to 3.

Furthermore, the transport unit 18a comprises the transverse conveying element 28a for an influencing of a product arrangement of the products 24a. The transverse conveying element 28a, in particular the transverse conveyor belt, is supported movably along the conveying direction 26a, and is in particular drivable in a circulating manner, in a movement plane that is inclined relative to the main conveying plane 32a, in particular relative to the horizontal plane, and/or relative to the main conveying direction 20a. Alternatively or additionally, the transverse conveying element 28a may form a division conveying unit 22a, which is configured for a division of the main product stream 12a, in particular by a discharging of products 24a and/or by a division of the main product stream 12a into at least two product substreams 14a, 16a. The division conveying unit 22a, in particular the transverse conveying element 28a, in particular directly, follows the feed conveying element 66a of the transport unit 18a downstream along the main conveying direction 20a. Preferentially the transverse conveying element 28a is movable, in particular drivable, along the conveying direction 26a that runs transversely, in particular at least substantially perpendicularly, to the main conveying direction 20a. The transverse conveying element 28a, which is embodied as a transverse conveyor belt, is drivable in a circulating manner around a further guide unit 38a of the transport unit 18a, which is in particular at least substantially stationary relative to the guide unit 36a of the transport unit 18a. The transport unit 18a preferentially comprises at least one transverse drive unit 70a for a movement, in particular for a circulating drive, of the transverse conveying element 28a relative to the further guide unit 38a, in particular relative to a frame, of the transport unit 18a. The transverse drive unit 70a preferentially comprises at least one electromotor (not shown here in detail). In particular, the electromotor is configured for a rotating drive of a drive roller (not shown here in detail) adjoining the transverse conveying element 28a that is embodied as a transverse conveyor belt. The electromotor may be connected to the drive roller directly or may be connected to the drive roller indirectly via, for example, a gear, a belt drive, a chain, a gearwheel or the like. Alternatively or additionally, the transverse drive unit 70a may comprise further components which are deemed expedient by someone skilled in the art and which are configured for a drive of the transverse conveying element 28a, or the transverse drive unit 70a and/or the transverse conveying element 28a may have a different implementation deemed expedient by someone skilled in the art.

Figure 3:
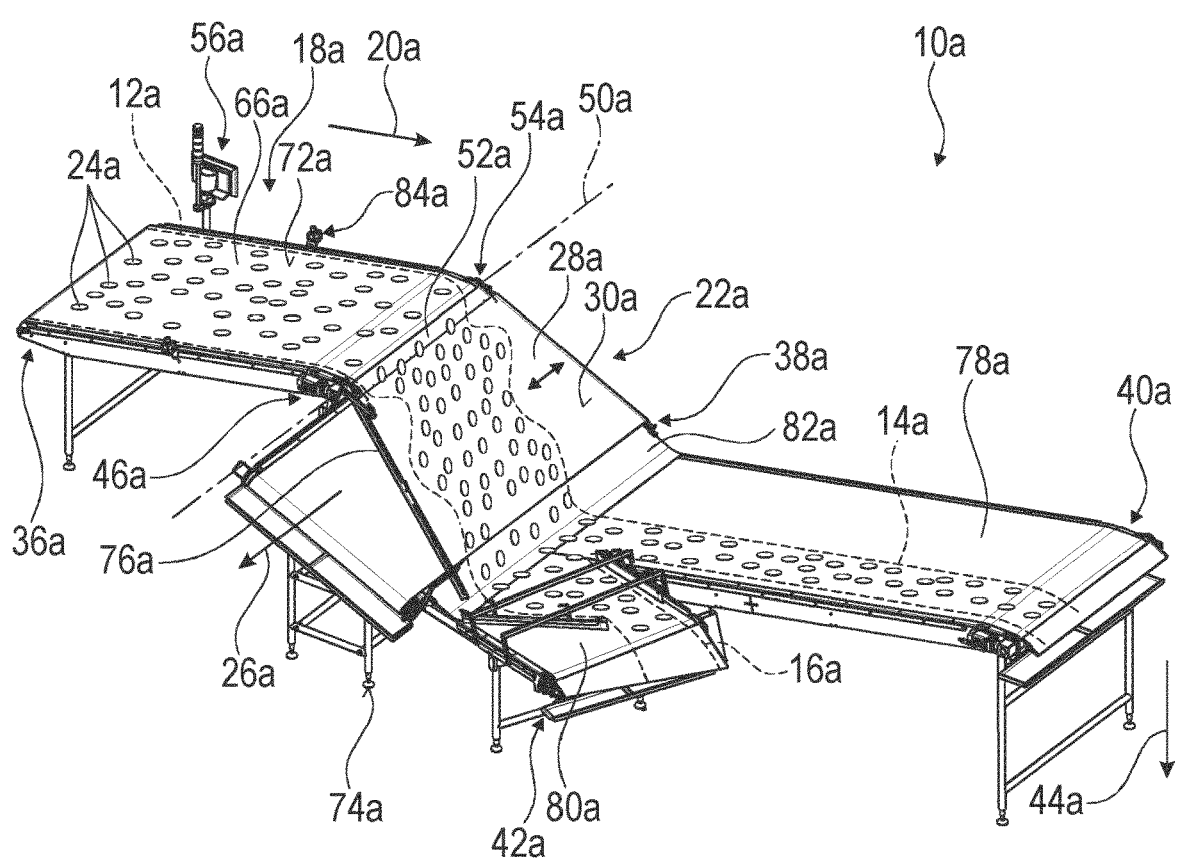
FIG. 3 shows a further detail view of the handling device according to the invention in a schematic representation.

Furthermore, the handling device 10a comprises at least one control or regulation unit 56a at least for a controlling or regulation of a drive parameter of the transverse conveying element 28a for an influencing of the product arrangement on the conveying element 78a (cf. FIGS. 2 and 3). The control or regulation unit 56a is preferably configured for controlling or regulating a drive parameter that is realized as a movement of the transverse conveying element 28a in the movement plane of the transport unit 18a that is inclined relative to the main conveying plane 32a, in particular relative to the horizontal plane, and/or relative to the main conveying direction 20a, in particular for controlling or regulating a conveyor belt speed and/or a conveyor belt circulation direction of the transverse conveying element 28a, for the purpose of influencing the product arrangement on the conveying element 78a. Alternatively or additionally, the control or regulation unit 56a may be configured for controlling or regulating at least one speed parameter of the division conveying unit 22a in order to influence the division of the main product stream 12a.

The handling device 10a preferably comprises at least one sensor unit 84a, which is configured for a detection of at least one product parameter, in particular a position, of the conveyed products 24a or for a detection of a production-specific parameter of the production machine 58a (cf. FIGS. 2 and 3). The control or regulation unit 56a is preferably configured for controlling or regulating a movement of the transverse conveying element 28a in the movement plane of the transport unit 18a, which is inclined relative to the main conveying plane 32a, in particular relative to the horizontal plane, and/or relative to the main conveying direction 20a, as a function of at least one sensor signal of the sensor unit 84a. The sensor unit 84a is preferably connected to the control or regulation unit 56a in terms of data technology. A speed parameter of the transverse conveying element 28a is preferably controlled or regulated by means of the control or regulation unit 56a as a function of product parameters detected by the sensor unit 84a and/or of detected production-specific parameters. The sensor unit 84a preferably comprises at least one sensor element (not shown here in detail) for a detection of product parameters or for a detection of production-specific parameters. The sensor element may have any implementation deemed expedient by someone skilled in the art, such as, for example, an implementation as a camera, as a line laser, as an infrared sensor, as a light barrier, as a weighing sensor, as a position sensor or the like. The sensor unit 84a may comprise a plurality of sensor elements for a detection of different product parameters and/or production-specific variables.

The transverse conveying element 28a, in particular at least one conveying surface 30a of the transverse conveying element 28a, is arranged so as to be inclined relative to a main conveying plane 32a of the transport unit 18a. The transverse conveying element 28a, in particular at least the conveying surface 30a of the transverse conveying element 28a, is preferably arranged so as to be inclined relative to the main conveying plane 32a of the transport unit 18a and to the main conveying direction 20a in such a way that the transverse conveying element 28a forms a belt chute, in particular in at least one operation state. The conveying surface 30a of the transverse conveying element 28a is preferably a surface of the transverse conveying element 28a on which the products 24a rest during a transport by the transverse conveying element 28a. Preferably the main conveying plane 32a of the transport unit 18a is formed, in particular at least partially, by the product support surface 72a of the feed conveying element 66a of the transport unit 18a. The transverse conveying element 28a, in particular at least the conveying surface 30a of the transverse conveying element 28a, is preferably arranged so as to be inclined relative to the product support surface 72a of the feed conveying element 66a of the transport unit 18a. An inclination angle 34a of the transverse conveying element 28a, in particular of the conveying surface 30a of the transverse conveying element 28a, relative to the main conveying plane 32a and/or relative to the main conveying direction 20a is preferably measured starting from the transverse conveying element 28a, in particular starting from the conveying surface 30a of the transverse conveying element 28a, in a direction facing away from a ground contact surface 74a of the handling device 10a. Preferentially, viewed along the direction facing away from the ground contact surface 74a of the handling device 10a, the inclination angle 34a of the transverse conveying element 28a, in particular of the conveying surface 30a of the transverse conveying element 28a, relative to the main conveying plane 32a and/or relative to the main conveying direction 20a is preferably arranged between the conveying surface 30a of the transverse conveying element 28a and the main conveying plane 32a and/or the main conveying direction 20a, in particular starting from the conveying surface 30a of the transverse conveying element 28a. The conveying surface 30a of the transverse conveying element 28a and the main conveying plane 32a and/or the main conveying direction 20a preferably include the inclination angle 34a on a side of the transverse conveying element 28a that faces away from the ground contact surface 74a.

The inclination angle 34a of the transverse conveying element 28a, in particular of the conveying surface 30a of the transverse conveying element 28a, relative to the main conveying plane 32a and/or relative to the main conveying direction 20a has a value from a value range between 0° and 90°. Preferentially the inclination angle 34a of the transverse conveying element 28a, in particular of the conveying surface 30a of the transverse conveying element 28a, relative to the main conveying plane 32a and/or relative to the main conveying direction 20a has a value that is greater than 15° and smaller than 75°. In a measurement of a further inclination angle 48a of the transverse conveying element 28a, in particular of the conveying surface 30a of the transverse conveying element 28a, relative to the main conveying plane 32a and/or relative to the main conveying direction 20a on a side of the transverse conveying element 28a that faces towards the ground contact surface 74a, the further inclination angle 48a preferably has a value from a value range between 0° and 180°. Preferentially the further inclination angle 48a of the transverse conveying element 28a, in particular of the conveying surface 30a of the transverse conveying element 28a, relative to the main conveying plane 32a and/or relative to the main conveying direction 20a has a value that is greater than 0° and smaller than 180°. Preferably the further inclination angle 48a of the transverse conveying element 28a, in particular of the conveying surface 30a of the transverse conveying element 28a, relative to the main conveying plane 32a and/or relative to the main conveying direction 20a has a value that is greater than 105° and smaller than 165°. Preferentially a sum of the inclination angle 34a and the further inclination angle 48a is, in particular always, 180°.

The handling device 10a preferentially comprises at least one adjustment unit 46a for an, in particular continuous, adjustment of the inclination angle 34a and/or of the further inclination angle 48a of the transverse conveying element 28a, in particular of the conveying surface 30a of the transverse conveying element 28a, relative to the main conveying plane 32a and/or relative to the main conveying direction 20a, in particular by a movable support of the transverse conveying element 28a around a pivot axis 50a of the adjustment unit 46a that runs at least substantially parallel to the conveying direction 26a (cf. FIGS. 2 and 3). For example, it is conceivable that the guide unit 38a of the division conveying unit 22a is supported pivotably on the guide unit 36a of the transport unit 18a. The pivot axis 50a preferably runs at least substantially parallel to the main conveying plane 32a and at least substantially perpendicularly to the main conveying direction 20a. It is conceivable that the adjustment unit 46a comprises at least one actuator (not shown here in detail) configured to generate a drive force for an adjustment of the inclination angle 34a and/or of the further inclination angle 48a of the transverse conveying element 28a. The actuator can be configured as a servomotor, as a spindle motor or as another actuator deemed expedient by someone skilled in the art. Alternatively, it is conceivable that the adjustment unit 46a is realized as a manual adjustment unit and is configured for an adjustment of the inclination angle 34a and/or of the further inclination angle 48a of the transverse conveying element 28a brought about by a force input of an operator.

In an implementation of the transverse conveying element 28a for a division of the main product stream 12a into the at least two product substreams 14a, 16a, the handling device 10a preferably comprises at least one substream transport unit 40a, in particular a substream conveyor belt unit, which is formed by the conveying element 78a, and comprises at least one further substream transport unit 42a, in particular a substream conveyor belt unit. The conveying element 78a is preferably configured, after a division of the main product stream 12a into the at least two product substreams 14a, 16a, to convey one of the product substreams 14a, 16a. The further substream transport unit 42a is preferably configured, after a division of the main product stream 12a into the at least two product substreams 14a, 16a, to convey a further one of the product substreams 14a, 16a. The conveying element 78a and/or the further substream transport unit 42a are/is arranged offset relative to the feed conveying element 66a of the transport unit 18a along a direction 44a that runs at least substantially perpendicularly to the main conveying plane 32a, in particular to the horizontal plane. For a bridging of the offset between the feed conveying element 66a and the conveying element 78a and/or between the feed conveying element 66a and the further substream transport unit 42a, the transverse conveying element 28a is arranged so as to be inclined relative to the main conveying plane 32a, in particular to the horizontal plane. Products 24a are preferentially transferred from the main product stream 12a to the conveying element 78a and/or to the further substream transport unit 42a by the transverse conveying element 28a. A division ratio of conveyed products 24a is preferably adjustable as a function of a speed or of an acceleration of the transverse conveying element 28a. In the case of a standstill, in particular in a movement-free state, of the transverse conveying element 28a, the products 24a are transferred from the main product stream 12a to the conveying element 78a by the transverse conveying element 28a in an undivided manner, in particular by the products 24a sliding down onto the conveying element 78a via the transverse conveying element 28a. In a state when the transverse conveying element 28a is driven in the direction of the conveying direction 26a, the products 24a of the main product stream 12a are divided onto the conveying element 78a and the further substream transport unit 42a depending on a speed or on an acceleration of the transverse conveying element 28a, wherein the main product stream 12a is divided into the product substream 14a along the conveying element 78a and into the further product substream 16a along the further substream transport unit 42a. In a back and forth driven state of the transverse conveying element 28a, a product arrangement for a buffering of the products 24a is preferably carried out depending on a speed or on an acceleration of the transverse conveying element 28a, wherein the products 24a are preferably transferred to the conveying element 78a in a modified product arrangement. However, it is also conceivable that, in the back and forth driven state of the transverse conveying element 28a, an influencing of the product arrangement and a division of the main product stream 12a is carried out.

With regard to an arrangement in relation to the feed conveying element 66a, the conveying element 78a preferably forms an extension of the feed conveying element 66a along the main conveying direction 20a. With regard to an arrangement in relation to the feed conveying element 66a, the further substream transport unit 42a preferably forms a branching of the feed conveying element 66a transversely to the main conveying direction 20a. The conveying element 78a and the further substream transport unit 42a are preferably arranged at an angle to one another, in particular when viewed in a horizontally-extending plane. It is conceivable that a further transverse conveying element (not shown here in detail) of the handling device 10a is arranged downstream of the conveying element 78a in order to realize a buffer function in the product substream 14a. It is moreover conceivable that an additional transverse conveying element (not shown here in detail) of the handling device 10a is arranged downstream of the further substream transport unit 42a in order to realize a buffer function in the further product substream 16a of the further substream transport unit 42a. The conveying element 78a, in particular a product support surface of the conveying element 78a, and/or the further substream transport unit 42a, in particular a product support surface of a substream transport element 80a of the further substream transport unit 42a, are/is preferably oriented so as to be inclined relative to the horizontal plane, in particular in the exemplary embodiment of the handling device 10a that is shown in FIGS. 1 to 3.

The handling device 10a preferentially comprises at least one guide element 76a, which is configured to selectively feed products 24a, which are separated or discharged out of the main product stream 12a by the transverse conveying element 28a, to the conveying element 78a and/or to the further substream transport unit 42a. The guide element 76a preferably extends transversely over the transverse conveying element 28a, in particular along a direction that runs transversely to the main conveying direction 20a and/or transversely to the conveying direction 26a. The guide element 76a is preferably configured to selectively guide products 24a, which might be carried beyond the transverse conveying element 28a due to an acceleration of the transverse conveying element 28a for a division of the main product stream 12a, towards the conveying element 78a and/or towards the further substream transport unit 42a. The guide element 76a may be realized as an abutment, as a band, as a guide board, as a sidewall or the like. It is conceivable that the handling device 10a comprises a plurality of guide elements 76a, which are configured to selectively feed products 24a, which are separated or discharged out of the main product stream 12a by the transverse conveying element 28a, to the conveying element 78a and/or to the further substream transport unit 42a. Preferably, the handling device 10a comprises one or more guide element(s) 76a only in the region of the further substream transport unit 42a. The guide element(s) 76a is/are preferably supported movably, in particular in order to adjust a position of the guide element(s) 76a relative to the transverse conveying element 28a. The guide element(s) 76a may be supported so as to be movable continuously or step-wise. The guide element(s) 76a may be adjustable manually or in an actuator-assisted manner.

The handling device 10a preferably includes at least one bridging unit 54a, which in particular comprises at least one, preferably elastic, bridging element 52a, at least for a bridging or a covering of a gap between the feed conveying element 66a and the transverse conveying element 28a (cf. FIGS. 2 and 3). The bridging element 52a is preferably made of rubber, in particular of an elastomer. The bridging element 52a is preferably realized as a rubber lip, as a rubber strip, as a rubber extension or the like. It is also conceivable that the bridging element 52a is made of a synthetic material and is arranged as kind of an intermediate piece, such as for example a ramp or the like, between the feed conveying element 66a and the transverse conveying element 28a. However, it is also conceivable that the bridging element 52a has a different implementation deemed expedient by someone skilled in the art and/or is made of a different material deemed expedient by someone skilled in the art. The bridging unit 54a preferentially comprises at least one further bridging element 82a, which is configured for a bridging or a covering of a gap between the transverse conveying element 28a and the conveying element 78a and/or between the transverse conveying element 28a and the further substream transport unit 42a. The further bridging element 82a may have an implementation analogous to the bridging element 52a or may have an implementation different from the bridging element 52a.

Figure 4:
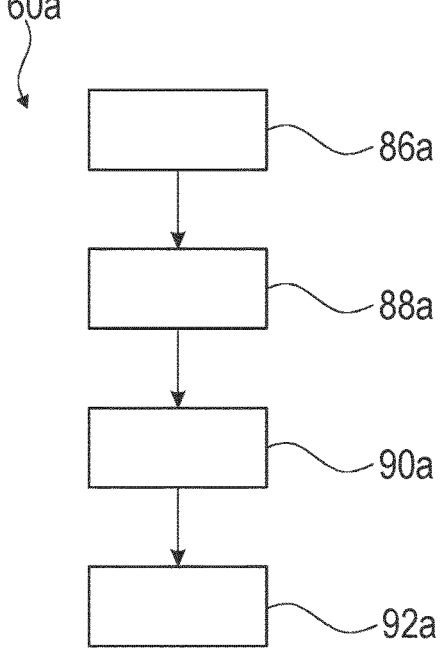
FIG. 4 shows a schematic process flow of a method according to the invention for a division of the main product stream by means of the handling device according to the invention.

FIG. 4 shows a schematic process flow of a method 60a for a buffering of products 24a, in particular food products, by means of the handling device 10a. It is conceivable that the method 60a is configured, depending on a controlling or regulation of a movement of the transverse conveying element 28a, alternatively or additionally to divide the main product stream 12a, in particular into at least two product substreams 14a, 16a, by means of the handling device 10a. In at least one method step 86a of the method 60a, the products 24a are conveyed by means of the feed conveying element 66a along the main conveying direction 20a. In at least one method step 88a of the method 60a, a product arrangement on the conveying element 78a is influenced depending on a drive parameter of the transverse conveying element 28a that is realized as a conveyor belt speed and/or depending on a drive parameter of the transverse conveying element 28a that is realized as a conveyor belt circulation direction. In the method step 88a, the transverse drive unit 70a is preferably actuated by the control or regulation unit 56a in such a way that the transverse conveying element 28a is moved so as to go back and forth along the conveying direction 26a and counter to the conveying direction 26a, in particular in order to influence a product arrangement. In the method step 88a, the transverse conveying element 28a is preferentially driven in an oscillating manner along the conveying direction 26a, in particular in order to realize a buffer function. Preferably, in a back-and-forth drive of the transverse conveying element 28a, an amplitude of a deflection of the transverse conveying element 28a is adjustable or variable by means of the control or regulation unit 56*a*, in particular depending on a product parameter and/or on a production-specific parameter.

Alternatively, in the method step 88*a* or in a further method step 90*a*, depending on a conveyor belt speed of the transverse conveying element 28*a*, a movement of the products 24*a* on the transverse conveying element 28*a* along the main conveying direction 20*a* is superimposed by a movement of the products 24*a* along the conveying direction 26*a*. The main product stream 12*a* can advantageously be divided into the two product substreams 14*a*, 16*a* as a result of the movement of the transverse conveying element 28*a* along the conveying direction 26*a*. A division ratio of conveyed products 24*a* is preferably adjustable as a function of a speed or of an acceleration of the transverse conveying element 28*a*. It is conceivable that all products 24*a* are conveyed onto the further substream transport unit 42*a*, that some products 24*a* are conveyed onto the further substream transport unit 42*a* and some products 24*a* are conveyed onto the conveying element 78*a*, or that all products 24*a* are conveyed onto the conveying element 78*a*.

In the case of a standstill, in particular in a movement-free state, of the transverse conveying element 28*a*, the products 24*a* of the main product stream 12*a* are arranged as fed by the feed conveying element 66*a* and/or are transferred to the conveying element 78*a* by the transverse conveying element 28*a* in an undivided manner, in particular by the products 24*a* sliding down onto the conveying element 78*a* via the transverse conveying element 28*a*. In a conveying-free state of the division conveying unit 22*a*, as a result of a sliding friction between the transverse conveying element 28*a*, in particular the conveying surface 30*a* of the transverse conveying element 28*a*, and the products 24*a*, the products 24*a* are conveyed along the main conveying direction 20*a* via the transverse conveying element 28*a*, in particular via the conveying surface 30*a* of the transverse conveying element 28*a*.

In at least one method step 92*a* of the method 60*a*, the products 24*a* are conveyed to the respective packaging devices 64*a* by means of the conveying element 78*a* and/or by means of the further substream transport unit 42*a*.

Figure 5:
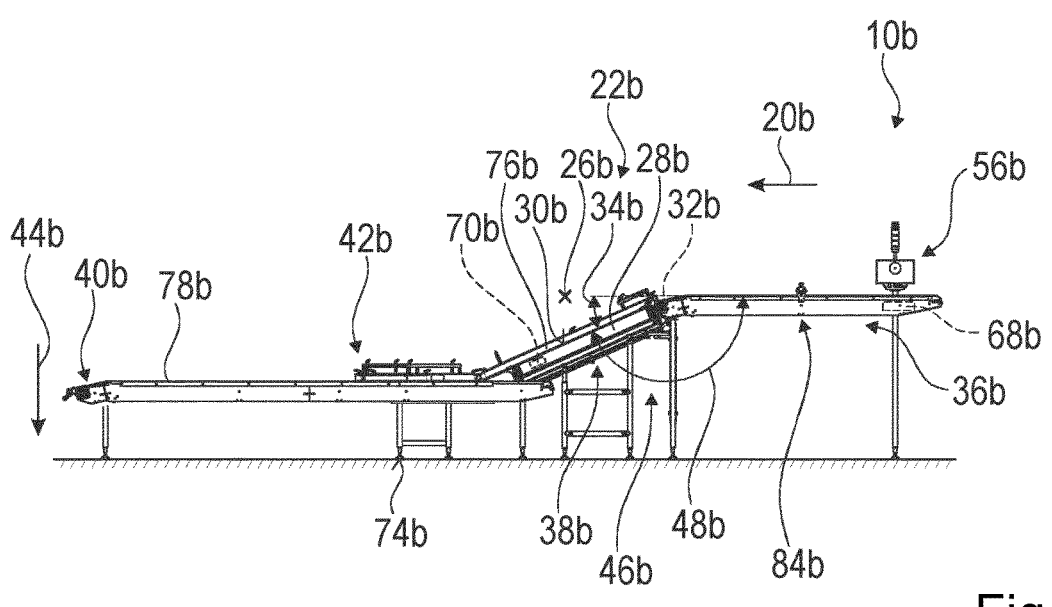
FIG. 5 shows a detail view of an alternative handling device according to the invention in a schematic representation.
Figure 6:
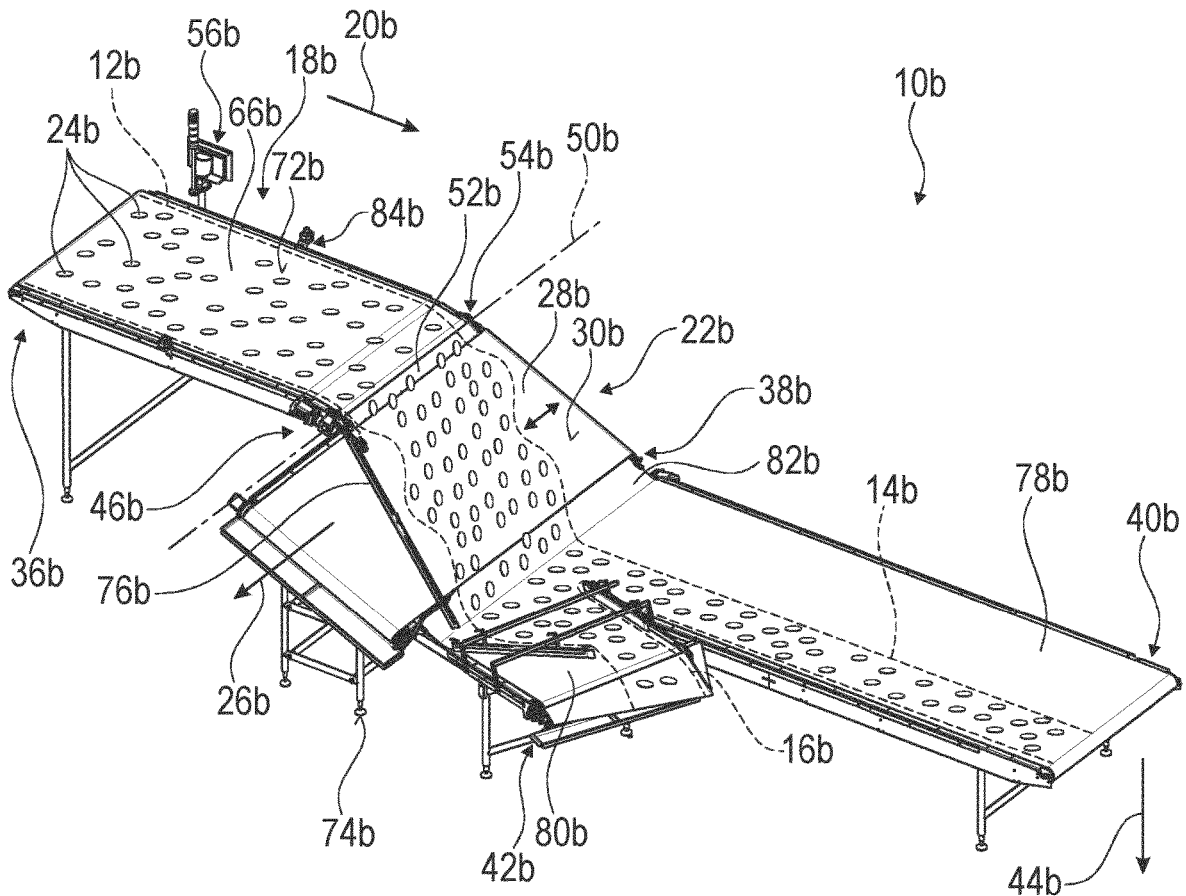
FIG. 6 shows a further detail view of the alternative handling device according to the invention in a schematic representation.

In FIGS. 5 and 6 a further exemplary embodiment is shown. The following description of FIGS. 5 and 6 as well as the FIGS. 5 and 6 themselves are essentially limited to the differences between the exemplary embodiments, wherein with respect to components having the same denomination, in particular with respect to components having the same reference numerals, in principle reference may also be made to the drawings and/or the description of the other exemplary embodiment, in particular of FIGS. 1 to 4. In order to differentiate between the exemplary embodiments, the letter a has been added to the reference numerals of the exemplary embodiment in FIGS. 1 to 4. In the exemplary embodiment of FIGS. 5 and 6, the letter a has been substituted by the letter b.

FIGS. 5 and 6 show an alternative handling device 10*b* for a buffering of products 24*b*, in particular food products. The handling device 10*b* comprises at least one transport unit 18*b*, in particular a conveyor belt unit, which comprises at least one feed conveying element 66*b*, in particular a feed conveyor belt, for conveying the products 24*b* along a main conveying direction 20*b* of the transport unit 18*b*, further comprises at least one transverse conveying element 28*b*, in particular a transverse conveyor belt, having a conveying direction 26*b* that runs transversely, in particular at least substantially perpendicularly, to the main conveying direction 20*b*, and comprises at least one conveying element 78*b*, in particular a conveyor belt, for conveying the products 24*b* along the main conveying direction 20*b*, in particular after an influencing of a product arrangement by the transverse conveying element 28*b*, wherein the transverse conveying element 28*b* is arranged downstream of the feed conveying element 66*b* along the main conveying direction 20*b*, and is in particular arranged directly adjoining the feed conveying element 66*b*, wherein the conveying element 78*b* is arranged downstream of the transverse conveying element 28*b* along the main conveying direction 20*b*, and is in particular arranged directly adjoining the transverse conveying element 28*b*. The transverse conveying element 28*b*, in particular at least one conveying surface 30*b* of the transverse conveying element 28*b*, is arranged so as to be inclined relative to a main conveying plane 32*b*, in particular a horizontal plane, of the transport unit 18*b*. Furthermore, the handling device 10*b* comprises at least one control or regulation unit 56*b* at least for a controlling or regulation of a drive parameter of the transverse conveying element 28*b* for influencing a product arrangement on the conveying element 78*b*.

The handling device 10*b* may additionally comprise at least one substream transport unit 42*b*, in particular a substream conveyor belt unit by means of which, after a division of a main product stream 12*b* into at least two product substreams 14*b*, 16*b*, one of the product substreams 14*b*, 16*b* can be conveyed. A product support surface 72*b* of the feed conveying element 66*b*, a product support surface of the conveying element 78*b* and/or a product support surface of a substream transport element 80*b* of the substream transport unit 42*b* are/is preferably oriented at least substantially parallel to a horizontal plane, in particular in the exemplary embodiment of the handling device 10*b* shown in FIGS. 5 and 6. With regard to further features of the handling device 10*b* and/or a method for a buffering of products 24*b* by means of the handling device 10*b*, reference is made to the description of FIGS. 1 to 4, which is also to be read analogously on FIGS. 5 and 6.

What is claimed is:

1. A handling device for a buffering of products (24*a*; 24*b*) comprising:

at least one transport unit (18*a*; 18*b*);

and at least one control or regulation unit (56*a*; 56*b*);

wherein the at least one transport unit (18*a*; 18*b*) comprises at least one feed conveying element (66*a*; 66*b*) configured as a feed conveyor belt for conveying the products along a main conveying direction (20*a*; 20*b*) of the transport unit (18*a*; 18*b*), further comprises at least one transverse conveying element (28*a*; 28*b*), which is configured as a transverse conveyor belt and which has a conveying direction (26*a*; 26*b*) that runs transversely to the main conveying direction (20*a*; 20*b*), and comprises at least one conveying element (78*a*; 78*b*) for conveying the products (24*a*; 24*b*) along the main conveying direction (20*a*; 20*b*) after an influencing of a product arrangement by the transverse conveying element (28*a*; 28*b*), wherein the at least one transverse conveying element (28*a*; 28*b*) is arranged downstream of the at least one feed conveying element (66*a*; 66*b*) along the main conveying direction (20*a*; 20*b*), wherein the at least one conveying element (78*a*; 78*b*) is arranged downstream of the at least one transverse conveying element (28*a*; 28*b*) along the main conveying direction (20*a*; 20*b*), wherein the at least one control or regulation unit (56*a*; 56*b*) is configured at least for controlling or regulating a drive parameter of the at least one transverse conveying element (28*a*;

28*b*) for influencing a product arrangement on the at least one conveying element (78*a*; 78*b*), wherein the at least one transverse conveying element (28*a*; 28*b*) is drivable so as to go back and forth along and counter to the conveying direction (26*a*; 26*b*), wherein the at least one transverse conveying element (28*a*; 28*b*) is configured, as a result of an oscillating movement, to change a product arrangement in order to realize a buffering of the products (24*a*; 24*b*), wherein the at least one transverse conveying element (28*a*; 28*b*) is arranged inclined relative to a main conveying plane (32*a*; 32*b*) of the at least one transport unit (18*a*; 18*b*).

2. The handling device according to claim 1, wherein an inclination angle (48*a*; 48*b*) of the at least one transverse conveying element (28*a*; 28*b*) relative to the main conveying plane (32*a*; 32*b*) and/or relative to the main conveying direction (20*a*; 20*b*) has a value from a value range between 0° and 90°.

3. The handling device according to claim 1, wherein the at least one transverse conveying element (28*a*; 28*b*) is supported movably along the conveying direction (26*a*; 26*b*) in a movement plane that is inclined relative to the main conveying plane (32*a*; 32*b*) and/or relative to the main conveying direction (20*a*; 20*b*).

4. The handling device according to claim 1, wherein the at least one control or regulation unit (56*a*; 56*b*) is configured for controlling or regulating a drive parameter of the at least one transverse conveying element (28*a*; 28*b*), which is realized as a movement of the at least one transverse conveying element (28*a*; 28*b*) in a movement plane of the at least one transport unit (18*a*; 18*b*) that is inclined relative to the main conveying plane (32*a*; 32*b*) and/or relative to the main conveying direction (20*a*; 20*b*) for the purpose of influencing the product arrangement on the at least one conveying element (78*a*; 78*b*).

5. The handling device according to claim 1, further comprising at least one sensor unit (84*a*; 84*b*) for a detection of a product parameter of products, wherein the at least one control or regulation unit (56*a*; 56*b*) is configured for controlling or regulating a movement of the at least one transverse conveying element (28*a*; 28*b*) in a movement plane of the at least one transport unit (18*a*; 18*b*) that is inclined relative to the main conveying plane (32*a*; 32*b*) and/or relative to the main conveying direction (20*a*; 20*b*), depending on at least one sensor signal of the at least one sensor unit (84*a*; 84*b*).

6. The handling device according to claim 1, further comprising at least one adjustment unit (46*a*; 46*b*) for an adjustment of an inclination angle of the at least one transverse conveying element (28*a*; 28*b*) relative to the main conveying plane (32*a*; 32*b*) and/or relative to the main conveying direction (20*a*; 20*b*).

7. The handling device according to claim 1, further comprising at least one bridging unit (54*a*; 54*b*) at least for a bridging or a covering of a gap between the at least one transverse conveying element (28*a*; 28*b*) and the at least one feed conveying element (66*a*; 66*b*).

8. A production machine with at least one handling device according to claim 1.

9. A method for buffering products by the handling device according to claim 1, wherein a product arrangement on the at least one conveying element (78*a*; 78*b*) is influenced depending on a drive parameter of the at least one transverse conveying element (28*a*; 28*b*), which is realized as a conveyor belt speed, and/or depending on a drive parameter of the at least one transverse conveying element (28*a*; 28*b*), which is realized as a conveyor belt circulation direction.

10. The method according to claim 9, wherein in a non-conveying state of the at least one transverse conveying element (28*a*; 28*b*), the products (24*a*; 24*b*) are conveyed along the main conveying direction (20*a*; 20*b*), via the at least one transverse conveying element (28*a*; 28*b*) due to a sliding friction between the at least one transverse conveying element (28*a*; 28*b*) and the products (24*a*; 24*b*).

11. A method for buffering products by the handling device according to claim 1, wherein in a non-conveying state of the at least one transverse conveying element (28*a*; 28*b*), the products (24*a*; 24*b*) are conveyed along the main conveying direction (20*a*; 20*b*), via the at least one transverse conveying element (28*a*; 28*b*) due to a sliding friction between the at least one transverse conveying element (28*a*; 28*b*) and the products (24*a*; 24*b*).

12. A handling device for a buffering of products (24*a*; 24*b*) comprising:

at least one transport unit (18*a*; 18*b*);

at least one control or regulation unit (56*a*; 56*b*); and at least one adjustment unit (46*a*; 46*b*) for an adjustment of an inclination angle of the at least one transverse conveying element (28*a*; 28*b*) relative to the main conveying plane (32*a*; 32*b*) and/or relative to the main conveying direction (20*a*; 20*b*);

wherein the at least one transport unit (18*a*; 18*b*) comprises at least one feed conveying element (66*a*; 66*b*) for conveying the products along a main conveying direction (20*a*; 20*b*) of the transport unit (18*a*; 18*b*), further comprises at least one transverse conveying element (28*a*; 28*b*), which is configured as a transverse conveyor belt and which has a conveying direction (26*a*; 26*b*) that runs transversely to the main conveying direction (20*a*; 20*b*), and comprises at least one conveying element (78*a*; 78*b*) for conveying the products (24*a*; 24*b*) along the main conveying direction (20*a*; 20*b*) after an influencing of a product arrangement by the transverse conveying element (28*a*; 28*b*), wherein the at least one transverse conveying element (28*a*; 28*b*) is arranged downstream of the at least one feed conveying element (66*a*; 66*b*) along the main conveying direction (20*a*; 20*b*), wherein the at least one conveying element (78*a*; 78*b*) is arranged downstream of the at least one transverse conveying element (28*a*; 28*b*) along the main conveying direction (20*a*; 20*b*), wherein the at least one control or regulation unit (56*a*; 56*b*) is configured at least for controlling or regulating a drive parameter of the at least one transverse conveying element (28*a*; 28*b*) for influencing a product arrangement on the at least one conveying element (78*a*; 78*b*), wherein the at least one transverse conveying element (28*a*; 28*b*) is arranged inclined relative to a main conveying plane (32*a*; 32*b*) of the at least one transport unit (18*a*; 18*b*).

* * * * *